United States Patent
Chen et al.

(10) Patent No.: US 10,985,384 B2
(45) Date of Patent: Apr. 20, 2021

(54) CORROSION RESISTANT CURRENT COLLECTOR FOR HIGH-TEMPERATURE FUEL CELL

(71) Applicant: FuelCell Energy, Inc., Danbury, CT (US)

(72) Inventors: Ling Chen, Woodbury, CT (US); Chao-Yi Yuh, New Milford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 331 days.

(21) Appl. No.: 15/868,001

(22) Filed: Jan. 11, 2018

(65) Prior Publication Data
US 2019/0214653 A1 Jul. 11, 2019

(51) Int. Cl.
| | |
|---|---|
| *H01M 8/021* | (2016.01) |
| *H01M 8/0254* | (2016.01) |
| *H01M 8/0245* | (2016.01) |
| *H01M 8/14* | (2006.01) |
| *H01M 8/0228* | (2016.01) |
| *H01M 8/0206* | (2016.01) |
| *C22C 38/02* | (2006.01) |
| *C22C 38/58* | (2006.01) |
| *C22C 38/44* | (2006.01) |
| *C22C 38/52* | (2006.01) |

(52) U.S. Cl.
CPC ......... *H01M 8/021* (2013.01); *H01M 8/0206* (2013.01); *H01M 8/0228* (2013.01); *H01M 8/0245* (2013.01); *H01M 8/0254* (2013.01); *H01M 8/145* (2013.01); *C22C 38/02* (2013.01); *C22C 38/44* (2013.01); *C22C 38/52* (2013.01); *C22C 38/58* (2013.01); *H01M 2008/147* (2013.01)

(58) Field of Classification Search
CPC .......................... H01M 8/021; H01M 8/0228
See application file for complete search history.

(56) References Cited

U.S. PATENT DOCUMENTS

| | | | |
|---|---|---|---|
| 5,643,690 A * | 7/1997 | Tateishi | H01M 8/0206 429/478 |
| 6,117,580 A | 9/2000 | Nitschke et al. | |
| 6,855,451 B2 | 2/2005 | Ghosh et al. | |
| 7,919,214 B2 | 4/2011 | Xu et al. | |
| 7,919,946 B2 | 4/2011 | Ehlich et al. | |
| 2005/0196657 A1 * | 9/2005 | Sarkar | C04B 38/06 429/423 |
| 2011/0008714 A1 * | 1/2011 | Abd Elhamid | H01M 8/0206 429/518 |
| 2015/0171455 A1 * | 6/2015 | Mills | H01M 8/00 429/422 |

* cited by examiner

*Primary Examiner* — Tae-Sik Kang
(74) *Attorney, Agent, or Firm* — Foley & Lardner LLP

(57) ABSTRACT

A cathode current collector is made from a composite material including a first metallic layer made of a first metal and a second metallic layer made of a second metal different from the first metal. The first metallic layer is cladded with the second metallic layer. The first metallic layer is configured to form a conductive oxide corrosion layer in the presence of oxygen, molten carbonate electrolyte, or a combination thereof. The second metallic layer is corrosion resistant.

20 Claims, 4 Drawing Sheets

CORROSION RESISTANT CURRENT COLLECTOR FOR HIGH-TEMPERATURE FUEL CELL

BACKGROUND

The present disclosure relates to a fuel cell. In particular, the present disclosure relates to a cladded metallic cathode current collector that exhibits enhanced corrosion protection.

A fuel cell is a device that directly converts chemical energy stored in hydrocarbon fuel into electrical energy by means of an electrochemical reaction. High temperature fuel cells, such as solid oxide fuel cells (SOFCs) or molten carbonate fuel cells (MCFCs), comprise an ion-conducting electrolyte sandwiched between a cathode and an anode. Fuel cells operate by passing a reactant fuel gas through the anode, while passing oxidizing gas through the cathode. Oxygen combines with electrons at the cathode to form oxygen or carbonate ions, which are conducted through the ion-conducting electrolyte to the anode. At the anode, oxygen or carbonate ions combine with hydrogen and carbon monoxide to form water and carbon dioxide, thereby liberating electrons. The fuel cells are stacked and interleaved with bipolar plates that distribute gases to the electrode surfaces. A "bipolar plate" is a term commonly used for an assembly that includes a separator plate along with a cathode interconnect and anode interconnect positioned on opposite sides of the separator plate. In order to produce a desired power level, a number of individual fuel cells may be stacked in series with a bipolar plate between each cell. For reference, one example of a fuel cell is described in U.S. Pat. No. 6,855,451.

In conventional systems, a cathode current collector is disposed between and in direct contact with an electrolyte-containing cathode and a bipolar plate. The presence of the electrolyte induces corrosion of the cathode current collector. In some cases, the corrosion is too severe for the fuel cell to operate beyond seven years.

Several solutions have been proposed in an attempt to address the corrosion problems. For example in MCFC, others have proposed increasing the thickness of the cathode current collector material, but this does not address the corrosion-associated electrolyte loss. Others have also proposed replacing the cathode current collector material with a more corrosion-resistant stainless steel alloy, for example, a Type 310 austenitic stainless steel (Fe-base, 24-26 wt % Cr, 19-22 wt % Ni). However, this generally results in the formation of an oxide corrosion layer with insufficient conductivity. A less-conductive oxide corrosion layer can contribute to a higher cell ohmic resistance and a lower power output. In addition, others have proposed providing an aluminum coating protection layer on the cathode current collector (see, for example, U.S. Pat. No. 6,117,580). However, an aluminum coating process generally requires high-cost capital investment for the coating chamber, an additional sanding process is required to remove the aluminum coating at the cathode-contact surface or a high contact resistance due to aluminum oxide formation can occur. Moreover, others have proposed using conductive oxide coatings (see, for example, U.S. Pat. Nos. 7,919,214 and 7,919,946). However, the conductive oxide coating process requires an expensive coating bath and subsequent heat-treating steps.

A need exists for improved technology, including technology related to a cathode current collector that exhibits enhanced corrosion protection, while maintaining a low cathode current collector to cathode contact resistance.

SUMMARY OF THE INVENTION

In some embodiments, a cathode current collector is made from a composite material including a first metallic layer comprised of a first metal and a second metallic layer comprised of a second metal different from the first metal. The first metallic layer is cladded with the second metallic layer. The first metallic layer is configured to form a conductive oxide corrosion layer in the presence of oxygen and/or molten carbonate electrolyte. The second metallic layer is corrosion resistant.

In other embodiments, a fuel cell includes a cathode assembly having a cathode and a cathode current collector, an anode assembly having an anode and an anode current collector, and an electrolyte matrix provided between the cathode assembly and the anode assembly. The cathode current collector is made from a composite material including a first metallic layer comprised of a first metal and a second metallic layer comprised of a second metal different from the first metal. The first metallic layer is cladded with the second metallic layer. The first metallic layer is configured to form a conductive oxide corrosion layer in the presence of oxygen and/or molten carbonate electrolyte. The second metallic layer is corrosion resistant.

Additional embodiments include steps for a method of manufacturing a cathode current collector of a fuel cell that includes a cathode assembly including a cathode and the cathode current collector, an anode assembly including an anode and an anode current collector, and an electrolyte matrix provided between the cathode assembly and the anode assembly. The method includes producing a composite material including a first metallic layer comprised of a first metal and a second metallic layer comprised of a second metal different from the first metal, and forming the composite material into a desired shape and size of the cathode current collector. The composite material is produced by cladding the first metallic layer with the second metallic layer. The first metallic layer is configured to form a conductive oxide corrosion layer in the presence of oxygen and/or molten carbonate electrolyte. The second metallic layer is corrosion resistant.

These and other advantageous features will become apparent to those reviewing the disclosure and drawings.

BRIEF DESCRIPTION OF THE DRAWINGS

The details of one or more implementations of the subject matter described in this specification are set forth in the accompanying drawings and the description below. Other features and aspects of the subject matter will become apparent from the description, the drawings, and the claims presented herein

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
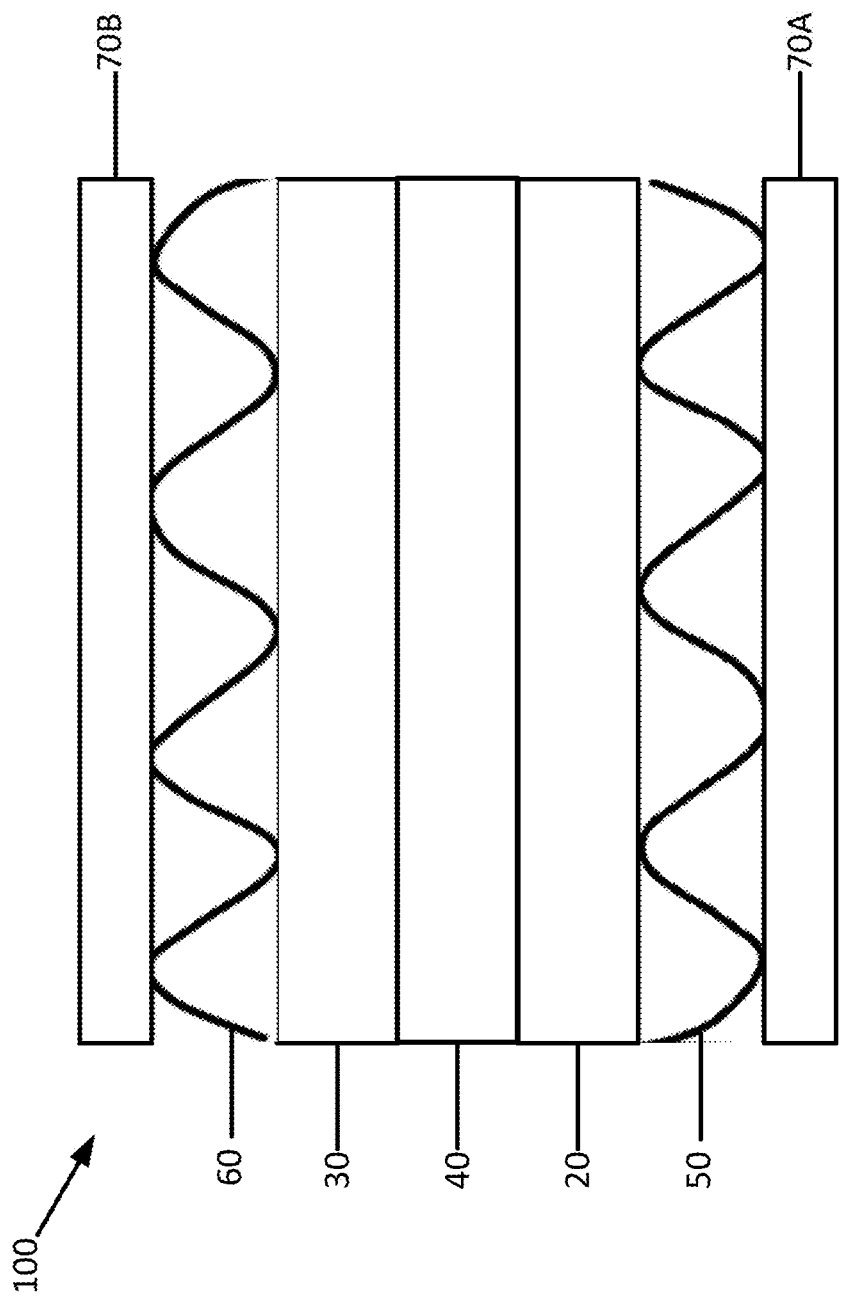
FIG. 1 illustrates a fuel cell including a cathode assembly having a cathode and a cathode current collector, an anode assembly having an anode and an anode current collector, and an electrolyte matrix provided between the cathode assembly and the anode assembly.

Referring to FIG. 1, a fuel cell 100 includes an anode 20, a cathode 30, and an electrolyte matrix 40 sandwiched between the anode 20 and the cathode 30. An anode side of the fuel cell 100 includes a bipolar plate 70A adjacent to an anode current collector 50. A cathode side of a fuel cell 100 includes a bipolar plate 70B adjacent to a cathode current collector 60. The anode current collector 50 and the cathode current collector 60, distribute reactant gases to the anode 20 and the cathode 30, respectively. A "bipolar plate" is a term commonly used for an assembly that includes a separator plate along with a cathode interconnect and anode interconnect positioned on opposite sides of the separator plate. In order to produce a desired power level, a number of individual fuel cells may be stacked in series with a bipolar plate between each cell.

As illustrated in FIG. 1, the anode current collector 50 and the cathode current collector 60 are corrugated (i.e., include a plurality of corrugations on a surface thereof). A direct internal reforming (DIR) catalyst (not illustrated), which may be in the form of pellets, extruded paste, and/or a coated thin film, may be provided within the corrugations of the anode current collector 50. The DIR catalyst may be comprised, for example, of $Ni/Ce—ZrO_2$, $Ni/ZrO_2$, $Ni/MgAl_2O_4$, $Ni/CeO_2$, $Ni/Al_2O_3$, or $Ni/Al_2O_3—ZrO_2$. The DIR catalyst is not limited to these compositions.

The fuel cell 100 may be a high temperature fuel cell, such as a molten carbonate fuel cell (MCFC). In general, fuel cells operate by passing a reactant fuel gas through the anode, while passing oxidizing gas through the cathode. In general, a MCFC assembly includes an anode (e.g., a porous nickel anode) and a cathode (e.g., a porous lithiated nickel oxide cathode) that are separated by an electrolyte matrix storing carbonate electrolyte, such as mixtures of lithium carbonate/potassium carbonate ($Li_2CO_3/K_2CO_3$) or lithium carbonate/sodium carbonate ($Li_2CO_3/Na_2CO_3$). In MCFCs the electrolytes are heated to 550-650° C., and the salts melt and conduct carbonate ions ($CO_3^{-2}$) from the cathode to the anode. At the anode, hydrogen combines with carbonate ions (oxidation) to form water and carbon dioxide, thereby liberating electrons. At the cathode, oxygen combines with carbon dioxide and electrons from the anode (reduction) to produce carbonate ions.

The cathode current collector 60 is in direct contact with the cathode 30, which contains a portion of the electrolyte from the electrolyte matrix 40 during operation of the fuel cell 100. The presence of the electrolyte, air or other oxygen-containing gas, and the high temperature at the cathode induces corrosion of the cathode current collector 60. In general, the cathode current collector 60 is made of stainless steel, containing a predetermined minimum amount of chromium. During operation of the fuel cell 100, oxide layers form on the surface of the cathode current collector 60. While these oxide layers may be electrically conductive, formation of oxide layers leads to a loss of electrolyte. In particular, metal oxides of the oxide layer (e.g., chromium oxide) react with the lithium, potassium, or sodium ions of the electrolyte to form compounds such as lithium chromite, potassium chromate, sodium chromate, etc. As a result, the electrolyte is chemically broken down and lost, which leads to a degradation of the fuel cell and a decrease in the fuel cell output power.

Figure 2:
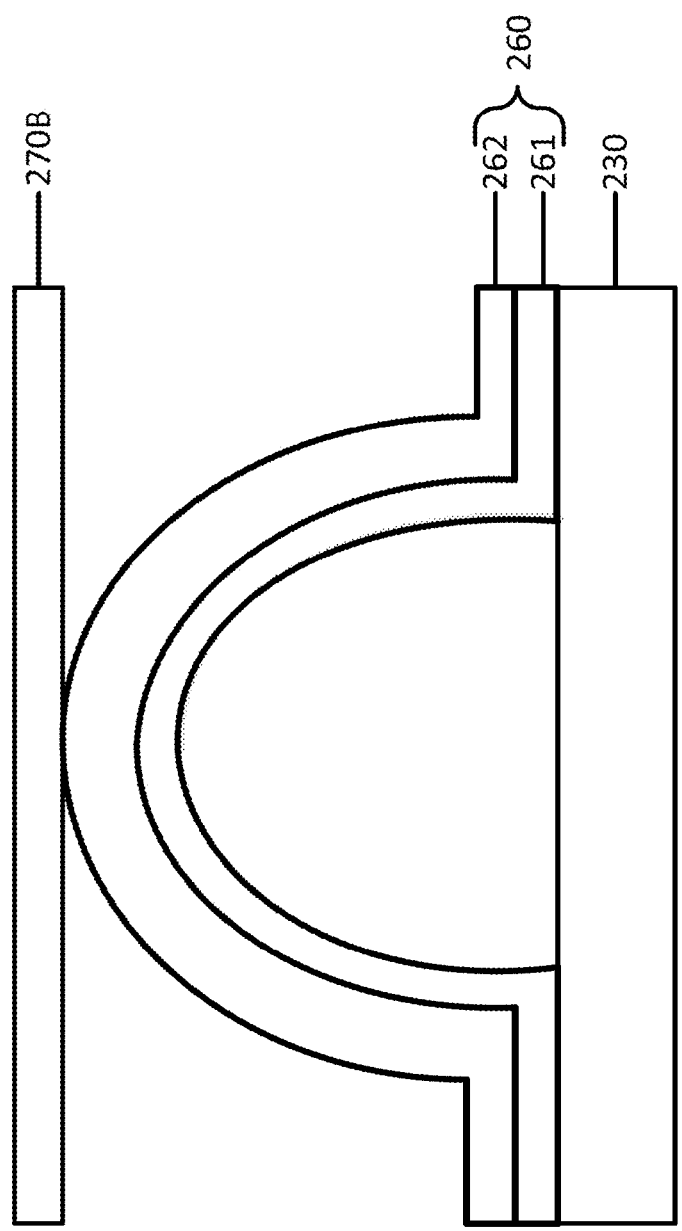
FIG. 2 illustrates a bi-layer cladded metallic cathode current collector.

Embodiments of the present application are intended to solve the problems related to corrosion of the cathode current collector and loss of electrolyte by using a cladded metallic cathode current collector. Referring to FIG. 2 (which illustrates an enlarged portion of a fuel cell structure similar to that shown in FIG. 1), on a cathode side of a fuel cell, a cathode current collector 260 is provided between a cathode 230 and a bipolar plate 270B. In some examples, the cathode current collector 260 comprises a cladded metallic cathode current collector that includes a first layer 261 and a second layer 262, where the first layer 261 and the second layer 262 are different metals that are cladded together (i.e., bonded at an interface). The first layer 261 is in contact with the cathode 230. The second layer 262 is in contact with the first layer 261 and the bipolar plate 270B. For enhancing corrosion protection, while maintaining a low cathode current collector to cathode contact resistance, the first layer 261 is configured to form a conductive oxide corrosion layer on a surface of the first layer 261 closest to the cathode 230. The conductive oxide corrosion layer formed by the first layer 261 is more conductive, as compared to the second layer 262. There is no oxide layer formation between the first layer 261 and the second layer 262. The second layer 262, which is not in direct contact with the cathode 230, has a high corrosion resistance. For example, FIG. 3, the higher Cr stainless steel 310S showed about a 50% reduction in corrosion rate than the lower Cr stainless steel 316L. The corrosion resistance of 310S is acceptable for MCFC cathode current collector use. Providing a first layer 261, which is capable of forming a conductive oxide corrosion-layer between the cathode 230 and a more corrosion-resistant second layer 262, reduces an overall corrosion rate while maintaining acceptable corrosion-related contact voltage loss. An acceptable contact resistance between the first layer 261 and the cathode 230 is less than or equal to 100 mΩ·cm² in 1500 h. It is projected that a 30% or greater reduction of corrosion rate can be realized. See experimental results shown in FIG. 3, where the first layer is 316L (about 18 wt % Cr) and the second layer is 310S (about 25 wt % Cr).

Figure 3:
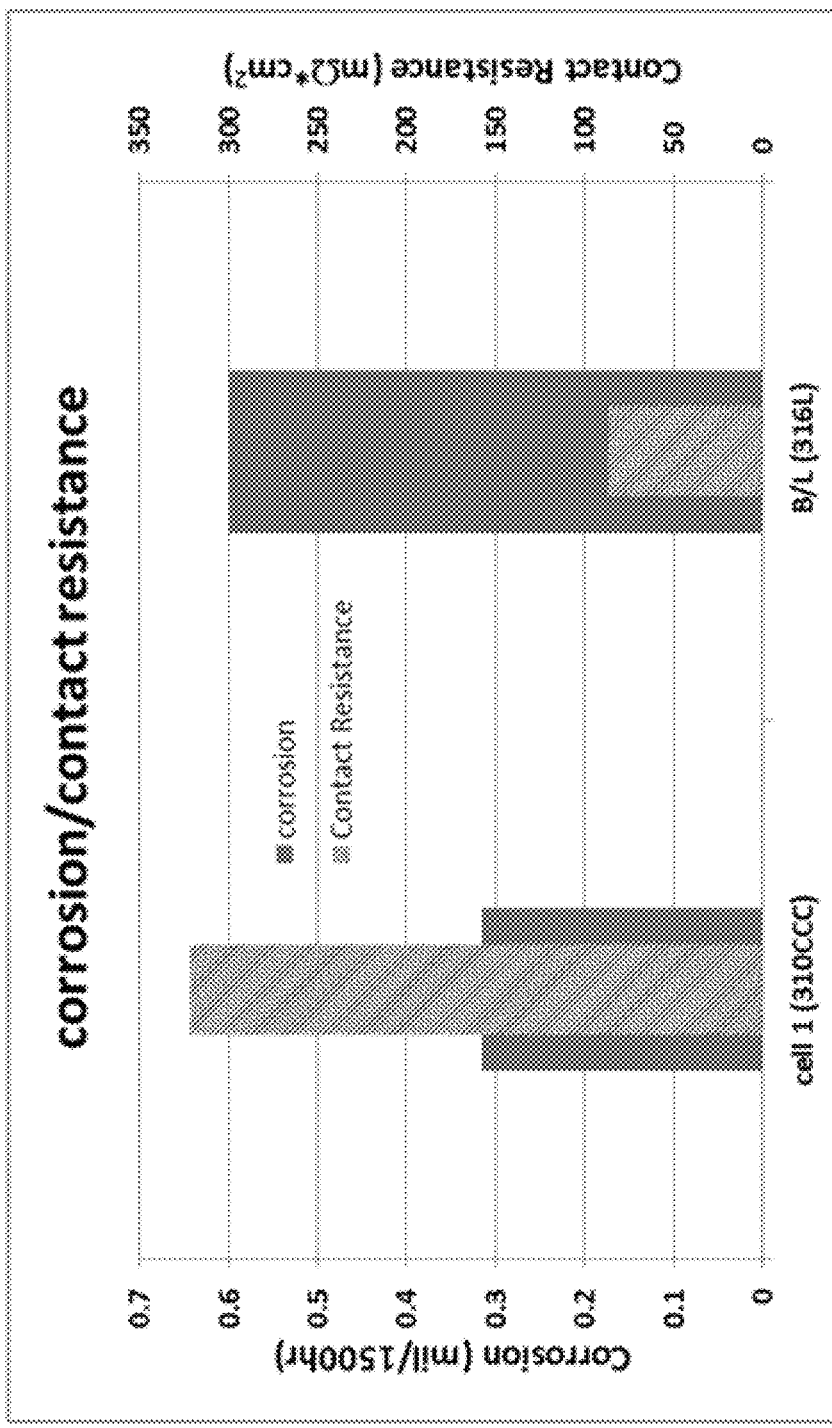
FIG. 3 is a graph showing the results of an out-of-cell test to compare the corrosion and contact resistance of two alloys.

In general, the first layer 261 is comprised of a conductive alloy, and the second layer 262 is comprised of a corrosion-resistant alloy. The first layer 261 and the second layer 262 may be comprised, for example, of different types or grades of stainless steel. In some aspects, the first layer 261 may be an austenitic stainless steel or a ferritic stainless steel. The first layer 261 may be a stainless steel including Cr, Ni, Mn, Mo, Co and a balance comprising Fe. The second layer 262 may be a stainless steel including Cr, Ni, Mn, Si, Mo and a balance of Fe. Two examples of specific combinations of alloys to be used for the first layer 261 and the second layer 262 are described below. The first layer 261 and the second layer 262 may be comprised of other alloys, provided that the first layer 261 exhibits sufficient corrosion resistance (e.g., corrosion consuming material is less than or equal to 0.6 mil in 1500 hr, as shown in FIG. 3) and forms a conductive corrosion oxide layer (e.g., scale) in contact with the cathode 230, and the second layer 262 is more corrosion resistance than the first layer 261 and meets an acceptable corrosion rate (e.g., 30% or greater reduction of corrosion rate (e.g., 0.6 mil in 1500 hr), which is less than or equal to 0.42 mil in 1500 hr). Moreover, the second layer 262 must have an acceptable contact resistance with the metallic bipolar plate 270B.

Example 1

In a first example, the first layer 261 comprises an austenitic stainless steel including 16-22 wt % Cr, 7-25 wt % Ni, 2-10 wt % Mn, 0-3 wt % Mo, 0-3 wt % Co, 0-2 wt % Si and a balance comprising Fe, for example, a Type 304, Type 316, Type 347, Sandvik 13RM19, or Nitronic 50 stainless steel. The second layer 262 comprises a corrosion-resistant stainless steel including 22-26 wt % Cr, 12-45 wt % Ni, ≤2 wt % Mn, 0-2 wt % Si, 0-3 wt % Mo, and a balance comprising Fe, for example, a Type 309, Type 310, Type 314, RA333, Sanicro 25, Sanicro28, or Incoloy 800 stainless steel. The balance comprising Fe of the first layer 261 and/or the second layer 262 may further include impurities such as C, P, S, etc. In some examples, the balance of the first layer 261 and/or the balance of the second layer 262 consists of Fe and impurities. In other examples, the balance of the first layer 261 and/or the balance of the second layer 262 consists of Fe.

Example 2

In a second example, the first layer 261 comprises a ferritic stainless steel including 16-22 wt % Cr, ≤2 wt % Mn, 0-3 wt % Mo, and a balance comprising Fe, for example, a Type 430, Type 441, Type 444, or Crofer22 stainless steel. The second layer 262 comprises a corrosion-resistant stainless steel including 22-26 wt % Cr, 12-45 wt % Ni, ≤2 wt % Mn, 0-2 wt % Si, 0-3 wt % Mo and a balance comprising Fe, for example, a Type 309, Type 310, Type 314, RA333, Sanicro25, Sanicro28, or IN800 stainless steel. The balance comprising Fe of the first layer 261 and/or the second layer 262 may further include impurities such as C, P, S, etc. In some examples, the balance of the first layer 261 and/or the balance of the second layer 262 consists of Fe and impurities. In other examples, the balance of the first layer 261 and/or the balance of the second layer 262 consists of Fe.

A thickness of the first layer 261 may be the same or different than a thickness of the second layer 262. In some examples, the first layer 261 is thinner than the second layer 262. For example, the first layer 261 may have a thickness of 75 to 150 μm, and the second layer 262 may have a thickness of 150 to 400 μm.

As illustrated in the enlarged portion of the fuel cell shown in FIG. 2, the cathode current collector 260 is corrugated. Thus, the first layer 261 and the second layer 262 are formed in an arc-like shape to form an arc-like corrugation of the cathode current collector 260. The first layer 261 and the second layer 262 are formed of two different metals and cladded together in a composite sheet form (i.e., a cladded sheet). In some examples, the thicker second layer 262 may be formed first, and the thinner first layer 261 may be added onto the second layer 262 in a cladding process to form the cladded sheet. The cladded sheet is then formed mechanically into the corrugated shape. However, the concepts disclosed in the present application are not necessarily limited in this regard. In other examples, the first layer 261 and the second layer 262 may be formed in any shape corresponding to a desired shape of a corrugation of the cathode current collector, or the first layer 261 and the second layer 262 can be planar, for example, if the cathode current collector is not corrugated.

Although FIG. 2 illustrates a single corrugation of the cathode current collector 260, it is understood that the first layer 261 and the second layer 262 form the entire cathode current collector 260. In other words, the first layer 261 and the second layer 262 form all of the protrusions and channels of the corrugated cathode current collector surface.

Although the examples above describe a bi-layer cladded metallic cathode current collector, the concepts disclosed herein are not limited in this regard. In other examples, the metallic cathode current collector may include more than two layers, for example, three layers, four layers, five layers, etc. The additional layers (e.g., the third layer, the fourth layer, the fifth layer, etc. should have the same or similar properties as the second layer 262.

Referring to FIG. 3, an out-of-cell test was performed with a single material as opposed to a composite, clad material. Based on the test results, the clad material is proposed to meet the requirements of both contact resistance and overall corrosion rate. As seen in FIG. 3, use of a more corrosion-resistant alloy tends to increase the metal-cathode contact resistance.

Cladding is a rapid process that mechanically bonds two or more different metal strips together. The cladded metallic cathode current collector includes two or more layers of different metals bonded together into a composite material tailored to fuel cell design specific needs and requirements. The bonding can be achieved, for example, by extruding the metals, diffusion bonding, pressing or rolling sheets together under pressure, roll bonding, explosive welding, laser cladding or any other known cladding process. The composite material is formed into a desired shape and size of the cathode current collector. For example, the cathode current collector may have a corrugated surface comprised of a plurality of peaks and valleys, or the cathode current collector may have a smooth, planar surface.

Figure 4:
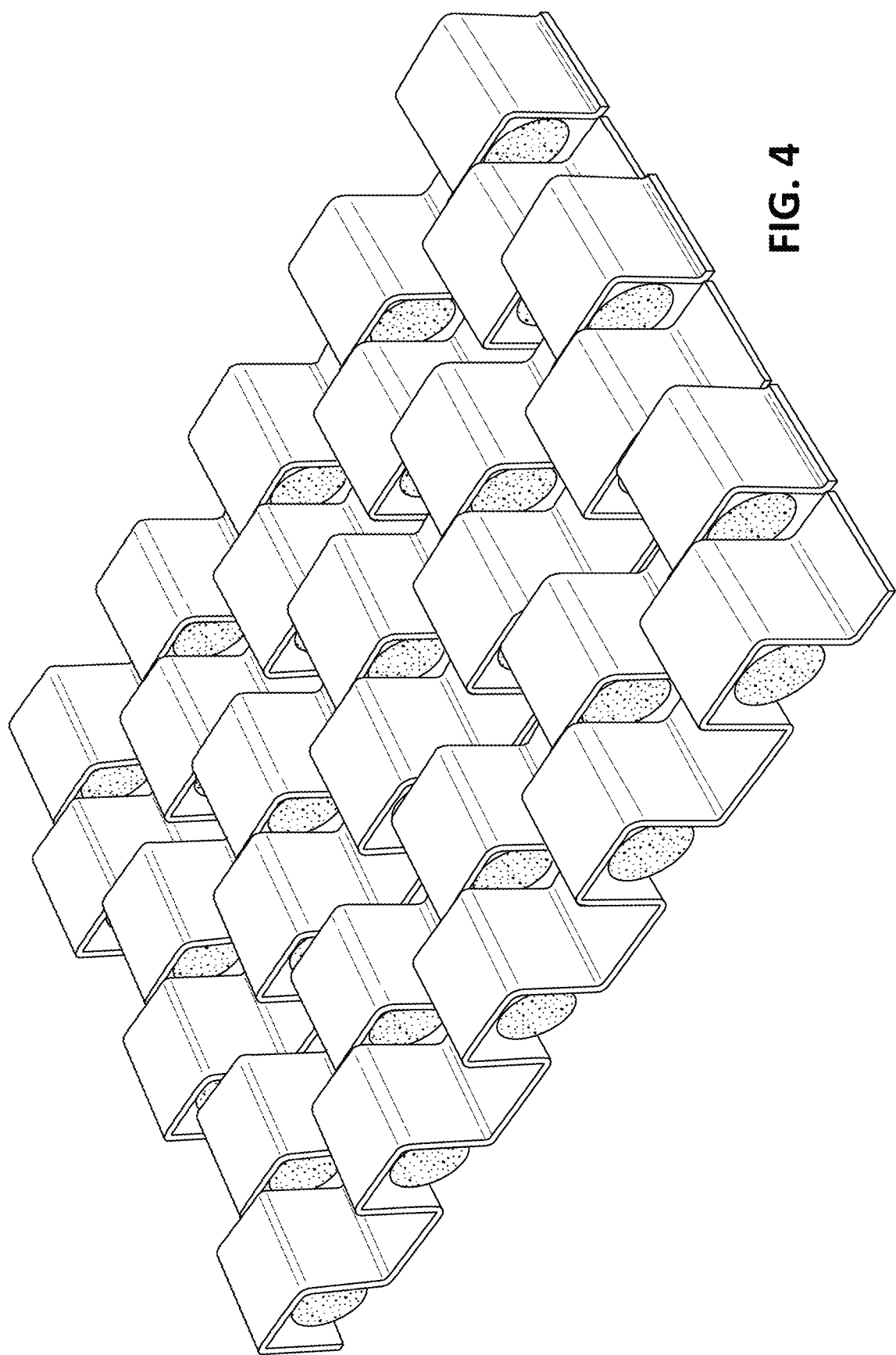
FIG. 4 illustrates a current collector including planar corrugations. The shape of the corrugations in FIG. 4 is an alternative to the shapes of the corrugations in FIG. 1 and FIG. 2.

Although FIG. 2 illustrates an example of a cathode current collector 260 in which a corrugation includes an arcuate projection and a planar portion formed between the arcuate projection and an adjacent corrugation, the concepts disclosed herein are not limited in this regard. As illustrated in FIG. 1, the corrugations of the anode current collector 50 and the cathode current collector 60 may be wavy or otherwise curved such that both the protrusions and the portions formed between adjacent protrusions are arcuate. Alternatively, as illustrated in FIG. 4, the anode current collector and the cathode current collector may include corrugations in which the protrusions and the portions formed between adjacent protrusions are planar. The clad metal designs, such as the cladded metallic cathode current collector described in the examples above may be applied to an anode current collector or a cathode current collector having any shape (e.g., corrugations of any shape). For example, other shapes may include cantilever type, straight-fine type or shielded-slot type.

Clad metal designs, such as the cladded metallic cathode current collector described in the examples above, can present advantages including weight savings, increased corrosion resistance, better thermal performance, and improved electrical conductivity. The cladded metallic cathode current collector is cost-effective to produce. By bonding different combinations of metals (e.g., a first layer configured to form a conductive oxide corrosion layer, and a more corrosion-resistant second layer), the advantages of the individual metals are combined into a composite cathode current collector material that is tailored to fuel cell design specific needs and requirements. A cathode current collector formed from the composite cathode current collector material exhibits enhanced corrosion protection, while maintaining a low cathode current collector to cathode contact resistance.

The construction and arrangements of the cathode current collector, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, image processing and segmentation algorithms, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

What is claimed is:

1. A cathode current collector comprising:
a composite material including a first metallic layer comprising a first metal and a second metallic layer comprising a second metal different from the first metal, the first metallic layer being cladded with the second metallic layer, wherein:
the first metallic layer is in direct contact with a cathode;
the first metallic layer comprises 16-22 wt % chromium, 7-25 wt % nickel, 2-10 wt % manganese, 0-3 wt % molybdenum, 0-3 wt % cobalt, 0-2 wt % silicon, and a balance of iron and impurity;
the second metallic layer is corrosion resistant; and
the second metallic layer is not in direct contact with the cathode.

2. The cathode current collector of claim 1, wherein:
the first metallic layer comprises a ferritic stainless steel including chromium, manganese, molybdenum, and iron; and
the second metallic layer comprises a stainless steel including chromium, nickel, manganese, silicon, molybdenum and iron.

3. The cathode current collector of claim 1, wherein:
the first metallic layer comprises an austenitic stainless steel including chromium, nickel, manganese, molybdenum, cobalt, silicon and iron; and
the second metallic layer comprises a stainless steel including chromium, nickel, manganese, silicon, molybdenum and iron.

4. The cathode current collector of claim 1, wherein the second metallic layer comprises 22-26 wt % chromium, 12-45 wt % nickel, 0-2 wt % manganese, 0-2 wt % silicon, 0-3 wt % molybdenum, and a balance of iron and impurity.

5. The cathode current collector of claim 1, wherein:
the first metallic layer comprises 16-22 wt % chromium, 0-2 wt % manganese, 0-3 wt % molybdenum, and a balance of iron and impurity; and
the second metallic layer comprises 22-26 wt % chromium, 12-45 wt % nickel, 0-2 wt % manganese, 0-2 wt % silicon, 0-3 wt % molybdenum, and a balance of iron and impurity.

6. The cathode current collector of claim 1, wherein:
the first metallic layer comprises a Type 304 stainless steel, a Type 316 stainless steel, a Type 347 stainless steel, a Type 13RM19 stainless steel, or a Nitronic 50 stainless steel; and
the second metallic layer comprises a Type 309 stainless steel, a Type 310 stainless steel, a Type 314 stainless steel, or an Incoloy 800 stainless steel.

7. The cathode current collector of claim 1, wherein:
the first metallic layer comprises a Type 430 stainless steel, a Type 441 stainless steel, a Type 444 stainless steel, or a Croffer 22 stainless steel; and
the second metallic layer comprises a Type 309 stainless steel, a Type 310 stainless steel, a Type 314 stainless steel, or an Incoloy 800 stainless steel.

8. The cathode current collector of claim 1, wherein a thickness of the second metallic layer is greater than a thickness of the first metallic layer.

9. The cathode current collector of claim 8, wherein:
the thickness of the first metallic layer is between 75 μm and 150 μm; and
the thickness of the second metallic layer is between 150 μm and 400 μm.

10. A fuel cell comprising:
a cathode assembly including a cathode and a cathode current collector;
an anode assembly including an anode and an anode current collector; and
an electrolyte matrix provided between the cathode assembly and the anode assembly; wherein:
the cathode current collector comprises a composite material including a first metallic layer comprising a first metal and a second metallic layer comprising of a second metal different from the first metal, the first metallic layer being cladded with the second metallic layer;
the first metallic layer is in direct contact with the cathode;
the first metallic layer comprises 16-22 wt % chromium, 7-25 wt % nickel, 2-10 wt % manganese, 0-3 wt % molybdenum, 0-3 wt % cobalt, 0-2 wt % silicon, and a balance of iron and impurity;

the second metallic layer is corrosion resistant; and
the second metallic layer is not in direct contact with the cathode.

11. The fuel cell of claim 10, wherein:
the first metallic layer comprises a ferritic stainless steel including chromium, manganese, molybdenum, and iron; and
the second metallic layer comprises a stainless steel including chromium, nickel, manganese, silicon, molybdenum and iron.

12. The fuel cell of claim 10, wherein:
the first metallic layer comprises an austenitic stainless steel including chromium, nickel, manganese, molybdenum, cobalt, silicon and iron; and
the second metallic layer comprises a stainless steel including chromium, nickel, manganese, silicon, molybdenum and iron.

13. The fuel cell of claim 10, wherein the second metallic layer comprises 22-26 wt % chromium, 12-45 wt % nickel, 0-2 wt % manganese, 0-2 wt % silicon, 0-3 wt % molybdenum, and a balance of iron and impurity.

14. The fuel cell of claim 10, wherein:
the first metallic layer comprises 16-22 wt % chromium, 0-2 wt % manganese, 0-3 wt % molybdenum, and a balance of iron and impurity; and
the second metallic layer comprises 22-26 wt % chromium, 12-45 wt % nickel, 0-2 wt % manganese, 0-2 wt % silicon, 0-3 wt % molybdenum, and a balance of iron and impurity.

15. The fuel cell of claim 10, wherein:
the first metallic layer comprises a Type 304 stainless steel, a Type 316 stainless steel, a Type 347 stainless steel, or a Type 13RM19 stainless steel, or a Nitronic 50 stainless steel; and
the second metallic layer comprises a Type 309 stainless steel, a Type 310 stainless steel, a Type 314 stainless steel, a RA333 stainless steel, a Sanicro25 stainless steel, a Sanicro28 stainless steel, or an Incoloy 800 stainless steel.

16. The fuel cell of claim 10, wherein:
the first metallic layer comprises a Type 430 stainless steel, a Type 441 stainless steel, a Type 444 stainless steel, or a Croffer 22 stainless steel; and
the second metallic layer comprises a Type 309 stainless steel, a Type 310 stainless steel, a Type 314 stainless steel, a RA333 stainless steel, a Sanicro25 stainless steel, a Sanicro28 stainless steel, or an Incoloy 800 stainless steel.

17. The fuel cell of claim 10, wherein a thickness of the second metallic layer is greater than a thickness of the first metallic layer.

18. The fuel cell of claim 10, wherein:
the fuel cell is a molten carbonate fuel cell; and
the electrolyte matrix comprises a molten alkali carbonate electrolyte.

19. A method of manufacturing a cathode current collector of a fuel cell, the fuel cell comprising a cathode assembly including a cathode and the cathode current collector, an anode assembly including an anode and an anode current collector, and an electrolyte matrix provided between the cathode assembly and the anode assembly, the method comprising:
producing a composite material including a first metallic layer comprising of a first metal and a second metallic layer comprising of a second metal different from the first metal, the composite material being produced by cladding the first metallic layer with the second metallic layer; and
forming the composite material into a desired shape and size of the cathode current collector; wherein:
the first metallic layer is in direct contact with the cathode
the first metallic layer comprises 16-22 wt % chromium, 7-25 wt % nickel, 2-10 wt % manganese, 0-3 wt % molybdenum, 0-3 wt % cobalt, 0-2 wt % silicon, and a balance of iron and impurity;
the second metallic layer is corrosion resistant; and
the second metallic layer is not in direct contact with the cathode.

20. The method of claim 19, wherein cladding the first metallic layer with the second metallic layer comprises extruding a metal comprising the first metallic layer and a metal comprising the second metallic layer, roll bonding or diffusion bonding the first metallic layer and the second metallic layer, or pressing a sheet of the metal comprising the first metallic layer and a sheet of the metal comprising the second metallic layer together under pressure.

* * * * *